(12) United States Patent
Bugli et al.

(10) Patent No.: US 6,890,366 B2
(45) Date of Patent: May 10, 2005

(54) SEALED ENGINE AIR FILTER SYSTEM

(75) Inventors: Neville Jimmy Bugli, Novi, MI (US); Celine Jee Dixon, Birmingham, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 4 days.

(21) Appl. No.: 10/417,527

(22) Filed: Apr. 17, 2003

(65) Prior Publication Data

US 2004/0206058 A1 Oct. 21, 2004

(51) Int. Cl.⁷ .......................... B01D 29/05; B01D 46/10
(52) U.S. Cl. ...................... 55/385.3; 55/487; 55/501; 55/502; 55/511; 55/527
(58) Field of Search ...................... 55/385.3, 485–487, 55/497, 501–505, 511, 527, 528

(56) References Cited

U.S. PATENT DOCUMENTS

| | | | | |
|---|---|---|---|---|
| 3,017,698 A | * | 1/1962 | Hambrecht et al. ........... 29/505 |
| 3,353,341 A | * | 11/1967 | Stripp .......................... 55/502 |
| 3,782,083 A | * | 1/1974 | Rosenberg .................... 55/491 |
| 3,932,153 A | | 1/1976 | Byrns |
| 4,133,661 A | | 1/1979 | Strnad |
| 4,148,732 A | * | 4/1979 | Burrow et al. ............... 210/232 |
| 4,404,006 A | * | 9/1983 | Williams et al. ............... 55/502 |
| 4,444,575 A | | 4/1984 | Miller et al. |
| 4,718,828 A | | 1/1988 | Breeck et al. |
| 4,826,517 A | | 5/1989 | Norman |
| 4,929,263 A | | 5/1990 | Kasugai |
| 4,995,891 A | * | 2/1991 | Jaynes .......................... 55/419 |
| 5,011,555 A | * | 4/1991 | Sager .......................... 156/73.1 |
| 5,213,596 A | * | 5/1993 | Kume et al. ................... 55/481 |
| 5,222,488 A | * | 6/1993 | Forsgren ................. 128/201.25 |
| 5,292,432 A | * | 3/1994 | Jainek et al. ................ 210/168 |
| 5,443,723 A | * | 8/1995 | Stankowski et al. .... 210/321.75 |
| 5,573,562 A | | 11/1996 | Schauwecker et al. |
| 5,605,554 A | * | 2/1997 | Kennedy ....................... 55/493 |
| 5,674,302 A | * | 10/1997 | Nakayama et al. ......... 55/385.3 |
| 5,723,047 A | | 3/1998 | Turnbull |
| 5,725,624 A | * | 3/1998 | Ernst et al. .................... 55/502 |
| 5,853,577 A | | 12/1998 | Gizowski et al. |
| 5,919,279 A | | 7/1999 | Merritt et al. |
| 6,033,455 A | * | 3/2000 | Kurashima .................... 55/497 |
| 6,156,089 A | * | 12/2000 | Stemmer et al. .............. 55/467 |
| 6,168,653 B1 | * | 1/2001 | Myers .............................. 96/4 |
| 6,209,541 B1 | * | 4/2001 | Wallace .................. 128/205.27 |
| 6,217,627 B1 | | 4/2001 | Vyskocil et al. |
| 6,293,984 B1 | * | 9/2001 | Oda et al. ...................... 55/497 |
| 6,464,761 B1 | | 10/2002 | Bugli |
| 6,592,655 B2 | * | 7/2003 | Iriyama et al. ............... 96/138 |
| 2001/0049999 A1 | | 12/2001 | Vanderveen et al. |
| 2002/0020156 A1 | * | 2/2002 | Goerg ........................ 55/385.3 |
| 2002/0069625 A1 | * | 6/2002 | Stass .......................... 55/385.3 |

FOREIGN PATENT DOCUMENTS

EP        0 995 535 A3     8/2001

* cited by examiner

Primary Examiner—Robert H. Spitzer
(74) Attorney, Agent, or Firm—Brinks Hofer Gilson & Lione

(57) ABSTRACT

The present invention is generally directed towards an air filter assembly in an air induction system in a motor vehicle. The air filter assembly comprises a housing and layered filter disposed in the housing. The air filter assembly provides for a sealing surface such that the air filter is sealed in the housing such that the filter can not removed without breaking the seal.

22 Claims, 4 Drawing Sheets

SEALED ENGINE AIR FILTER SYSTEM

TECHNICAL FIELD

This invention generally relates to a filter system and more specifically to an air induction system filter in a motor vehicle.

BACKGROUND

It is known to provide an air induction filter for an engine of a motor vehicle to filter out contaminants in air entering the engine. In the past, the air induction filter was typically made of pleated paper housed in a plastic or metal frame. The air induction filter and frame were mounted in an engine compartment of the motor vehicle. These air induction filters were used once and discarded.

Currently, the reticulated foam filter is typically made of a foam material and housed in a plastic housing due to the high temperatures in the engine compartment. The foam material is several layers thick and is attached to the housing with the help of darts that penetrate the surface of the filter. Although this method is effective in holding the filter in place, it does not completely seal the filter in the housing.

Therefore, there is a need in the industry to providing sealing surface in the housing of the air filter assembly such that the filter is completely sealed in the housing.

SUMMARY

In one aspect of the invention an air filter assembly for an air induction system is provided. The air filter assembly comprises a housing and a filter disposed in the housing. In order to seal the filter in the housing, the housing is provided with a filter capturing portion and an interlocking portion. In yet another aspect of the present invention, the filter capturing portion defines a cavity, that captures and holds the filter. The interlocking portion holds the air filter cover to the air filter tray.

In yet another aspect of the present invention, the air cleaner tray is provided with a curved flange. The air filter cover is provided with a corresponding flange that mates with the curved flange on the tray. The filter is compressed between the air cleaner tray and the air cleaner cover of the housing.

Further features and advantages of the invention will become apparent from the following discussion and the accompanying drawings in which:

DETAILED DESCRIPTION

The following description of the preferred embodiment is merely exemplary in nature and is in no way intended to limit the invention or its application or uses.

Figure 1:
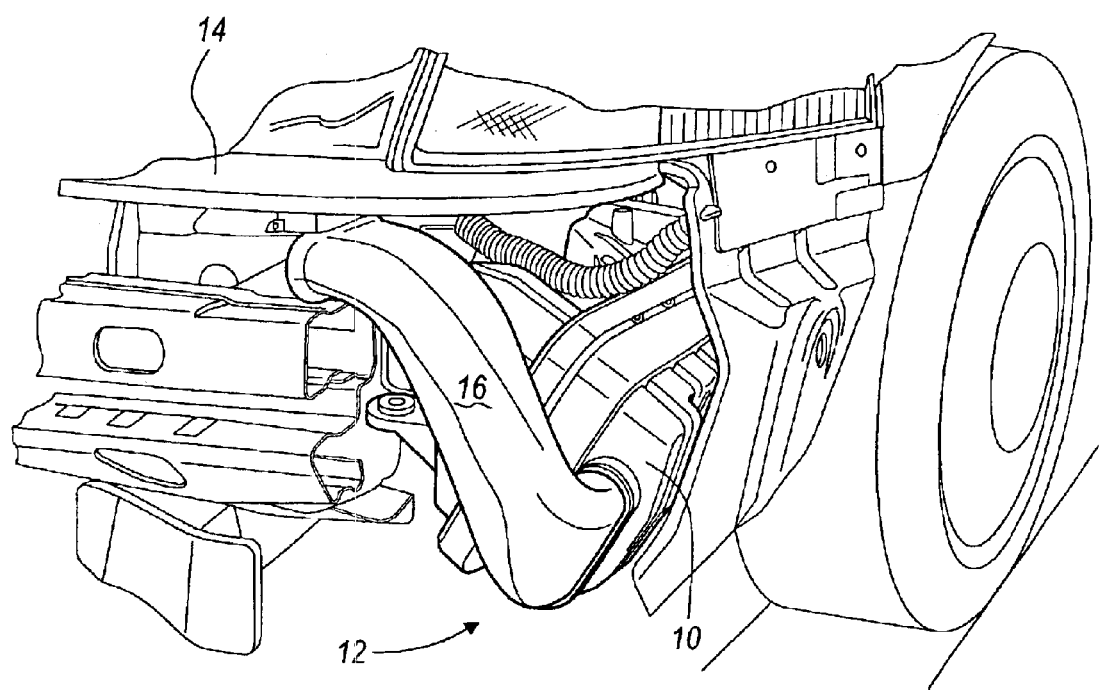
FIG. 1 is a perspective view of an air filter of the present invention as installed in the motor vehicle.

Referring now to the drawings and in particular FIG. 1, one embodiment of the air filter assembly 10, according to the present invention, is shown for a motor vehicle 12. As shown, the motor vehicle 12 includes a vehicle body 14 and an engine (not shown) mounted to the vehicle body 14. The motor vehicle 12 also includes an air inlet tube 16 operatively connected to the air filter assembly 10. The air induction filter assembly 10 is also mounted to the vehicle body 14 by suitable means such as fasteners (not Shown). The air filter assembly 10 serves to absorb ambient air through the air inlet tube 16 and filter the air before it is delivered to the engine of the motor vehicle 12. Although in this invention, an air filter assembly 10 specifically installed in the air induction system of the motor vehicle is explained, it must be understood that the air filter assembly may be used in other automotive components such as a heat ventilation air conditioning system (HVAC). The air filter assembly 10 may also be used in non automotive uses.

Figure 2:
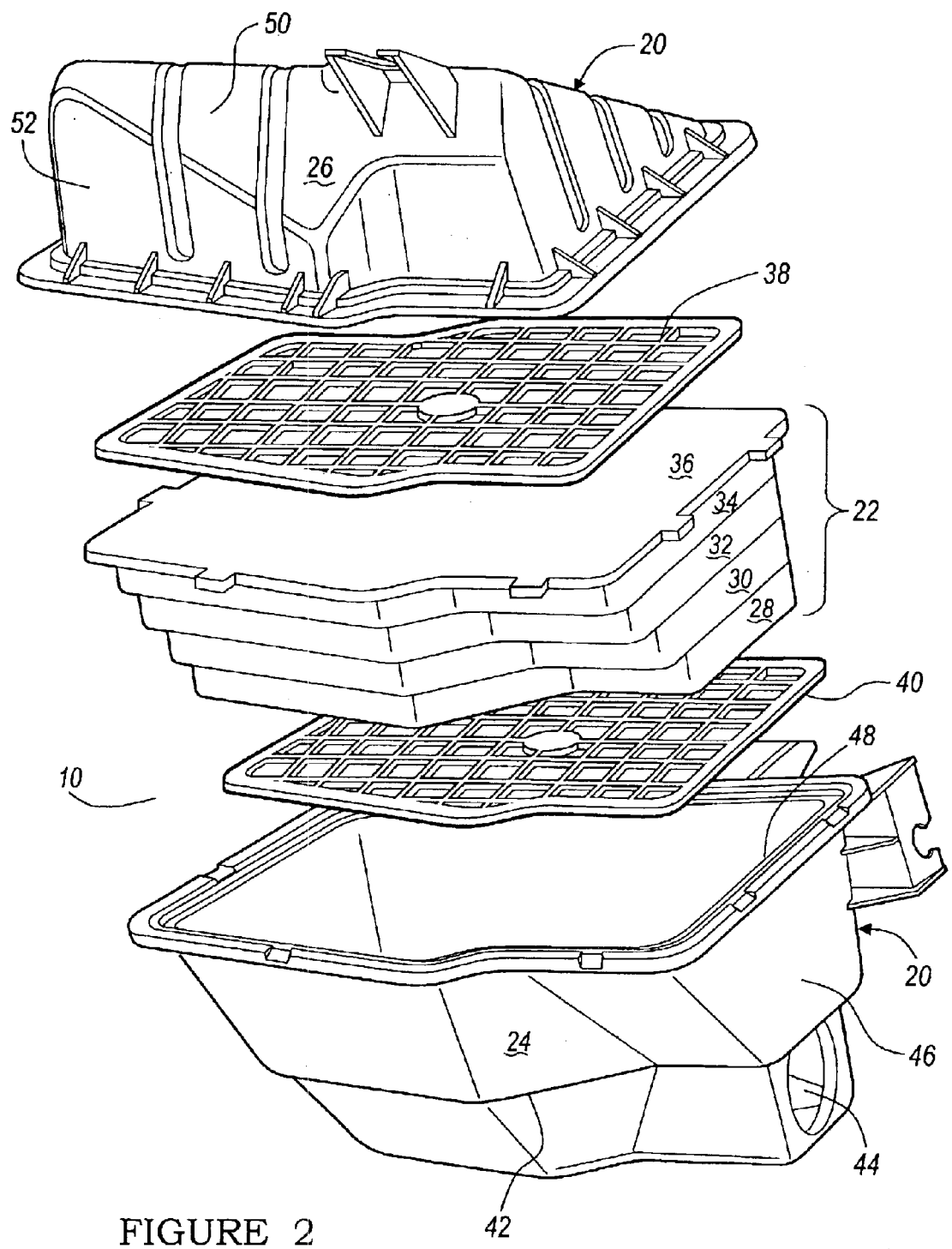
FIG. 2 is an exploded view of the air filter assembly in accordance with the teachings of the present invention.

Referring in particular to FIG. 2, the air filter assembly 10 includes a housing 20 and a filter 22 housed Inside the housing 20 to filter contaminants from the air to the engine and adsorb hydrocarbon vapors from the engine, when the engine is shut off. The housing 20 is mounted by suitable means (not shown) to the vehicle body 14 of the motor vehicle 12. The housing 20 includes an air cleaner tray 24 and an air cleaner cover 26. The filter 22 may have any suitable shape, preferably complementary to shape of the housing 20. Preferably the filter will accommodate the size and packaging requirements of the housing and such shapes may include complex geometrical shapes. As shown in FIG. 2, the filter 22 is multi-layered and includes a plurality of individual and separate layers 28, 30, 32, 34 and 36. Although In the drawings a 5 layer filter is shown and described, it must be understood that the air filter can comprise of more than five layers or fewer then five layers. The number of layers that the air filter is made is dictated by packaging and other conditions. A multi-layered air filter is described in U.S. Pat. No.: 6,484,761 and incorporated herein by reference.

With continued reference to FIG. 2, the air filter assembly 10 may also include a screen 38 disposed adjacent one side of the filter 22. The air induction filter assembly 10 may also include a second screen 40 disposed adjacent the other side of the filter 22. The screen 38 functions to filter larger particles from the air and thereby protecting the air filter. Additionally, screen 40 is included in the air filter assembly to support the filter during operation of the motor vehicle 12. As will be explained below the screens 36 and 40 compress the layers 28 and 36 of the filter 22 to achieve a firmness to provide a sealing surface. It should be appreciated that the screens 38 and 40 are optional.

Figure 3:
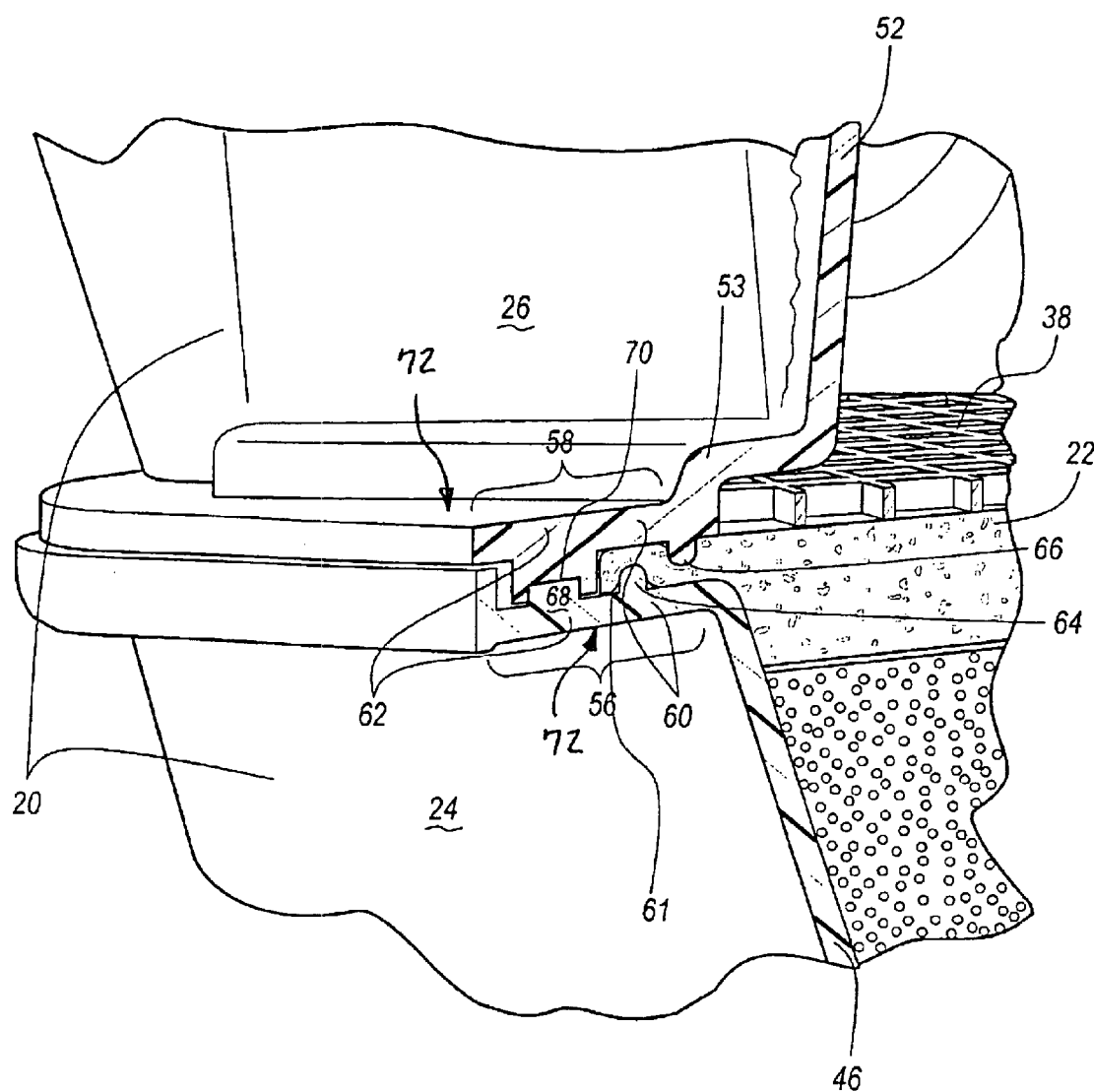
FIG. 3 is a cross-sectional view of an interlocking mechanism in the air filter assembly in accordance of the teachings of the present invention.

Referring in particular to FIGS. 2 and 3, the air cleaner tray 24 includes a base 42 that is attached to the body 14. The base 42 defines an opening 44 for connection to the air inlet tube 16. The base 42 is generally planar and may be rectangular in shape as shown or any complex geometrical shape dictated by packing and space requirements. The air cleaner tray 24 has a side wall is 46 extending upward from the base 42. The base 42 and the side walls 46 define a cavity 48 to house the filter 22. The air cleaner tray 24 is preferable made of a relatively rigid material, preferably a plastic material such us polypropylene, nylon etc. Preferably, the air cleaner tray 24 is a monolithic structure being integral, unitary and one-piece.

With continued reference to FIG. 2, like the air cleaner tray 24, the air cleaner cover 26 also includes a base 50 and upwardly extending side walls 52. An L-shaped wall 53 may optionally extend from the side wall 52 to provide additional support to the air cleaner cover 26 and the screen 38. The air cleaner cover 26 is made of a relatively rigid material, preferably a plastic material such as polypropylene, nylon etc. The air cleaner cover 26 is also a monolithic structure being integral, unitary and one-piece.

Referring in particular to FIG. 3, filter 22 is sealed with the housing 20 by providing a first flange 56 on the air cleaner tray 24 and a second flange 58 on the air cleaner cover 26. The first flange 56 extends generally perpendicular to the side wall 46 on the air cleaner tray 24. The second flange 58 extends generally perpendicular from the wall 53 on the air cleaner cover 26, such that the second flange 58 is positioned over the first flange 56. When the air cleaner tray 24 and the air cleaner cover 26 are assembled, the first flange 56 and the second flange 58 define a filter capturing portion 60 and an interlocking portion 62

As shown, the filter capturing portion 60 defines a second cavity 61 that allows the filter 22 to be inserted and compressed between the first flange 56 and the second flange 58. In particular one of the layers 36 of the filter 22 is oversized such that a portion of the layer is inserted into the second cavity 61. As shown in FIG. 3, in order to hold the filter in place and prevent the filter from rattling, the filter capturing portion 60 is provided with at least one retaining bead 64 on the first flange 56 and at least one retaining bead 66 on the second flange. Preferably, the retaining beads 64 and 66 extend laterally and inwardly towards the cavity 61 and compress into the layer 36 of the filter 22. It must be appreciated that the retaining beads 64 and 66 hold the filter 22 in place and prevent the liter 22 from rattling. The highly compressed filter 22 and retaining beads 64 and 66 prevent leakage of unfiltered air past the filter 22, resulting in increased reliability. Alternatively, instead of darts, a continuous staggered compression bead on flanges and may be used to provide additional sealing integrity.

With continued reference to FIG. 3, the interlocking portion 62 extends outwardly and beyond the filter capturing portion 60. The interlocking portion 62 functions to mate the first flange 56 with the second flange 58. The interlocking portion 62 is provided with at least one mating projection 68 on the first flange 56. The mating projection 68 is designed to be mated with a corresponding surface 70 on the second flange 58. As shown, us the air cleaner tray 24 and the air cleaner cover 26 are attached to each other at the interlocking portion 62. This arrangement ensures that the cover 26 is positioned properly over the tray 24 during assembly and installation of the air filter assembly 10 in the motor vehicle 12.

In order to completely seal the filter 22 in the housing 20, the first flange 56 and the second flange 58 are welded in the direction shown by arrows 72. Welding can be performed by any known methods such as laser welding, vibration welding etc. This will ensure that the layer 36 of the filter 22 inserted in second cavity 61 is compressed and welded to the housing 20.

As the air cleaner tray 24 and the air cleaner cover 26 are assembled, the portion of the filter 22 in the second cavity 61 is subject to compression such that an interference fit is created between the filter 22 and the housing 20. Furthermore as the first flange 56 and the second flange 58 are welded, the filter 22 may be visible along cover/tray interface. This provides as an additional safety check during assembly of the air filter assembly and to verify that the filter 22 is inserted properly into the housing 20. It should be appreciated that the highly compressed layer of foam will repel water and reduce the risk of ingestion through the cover/tray interface.

Figure 4:
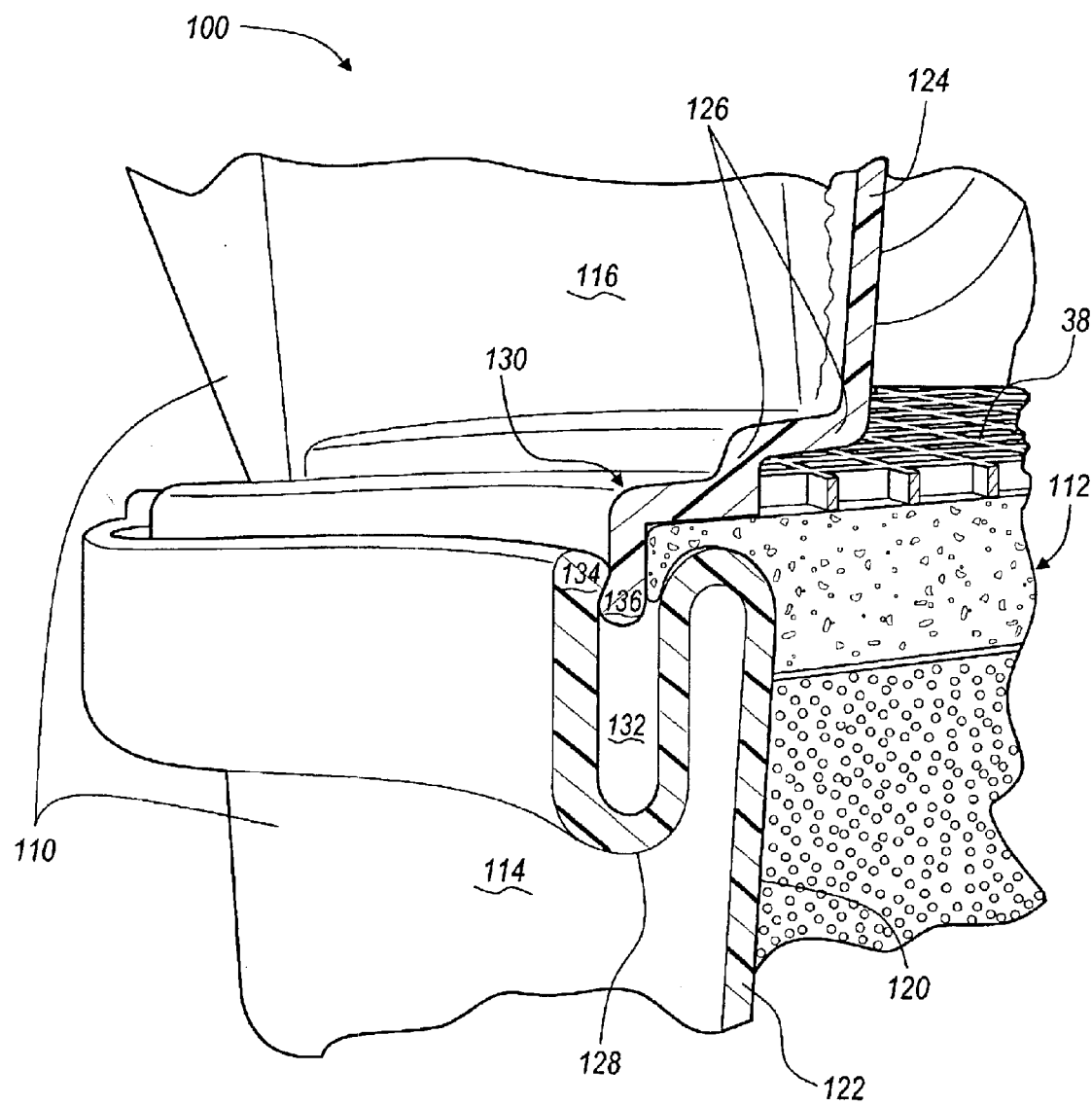
FIG. 4 is a cross sectional view of a second embodiment of the interlocking mechanism in the air filter assembly in accordance with the teachings of the present invention.

FIG. 4 represents an alternate embodiment of sealing the filter 22 inside the housing. Like the first embodiment, the air filter assembly 100 comprises a housing 110 and a filter 112 disposed inside the housing 110. Like the filter in the above embodiment, filter 112 receives ambient air before the air enters the engine and adsorbs hydrocarbons emitted by the engine during shut-off of the engine. The housing 110 comprises an air cleaner tray 114 and an air cleaner cover 116. The air cleaner tray 114 and the air cleaner cover 116 define a cavity 120, within which the filter 112 is disposed.

The air cleaner tray 114 has a base (not shown) and an upwardly extending wall 122 from the base. The air cleaner cover 116 also has a base (not shown) and wall 124 generally perpendicular from the base. An L-shaped wall 126 also extends from the wall 124 such that the edge of the air cleaner cover 116 has a tiered surface.

The filter 112 is sealed inside the housing by providing first flange 128 extending from the wall 122 of the air cleaner tray 114 and a second flange 130 extending from the L-shaped wall on the air cleaner cover 116. As shown, the first flange 128 is preferably U-shaped such that the air cleaner tray 144 forms a channel 132 between the U-shaped walls. The U-shaped flange will prevent water from leaking into the filter. Preferably, the first flange 128 extends around the perimeter of the air cleaner cover 116.

During assembly of the air filter assembly 100, the air cleaner cover 116 is positioned over the air cleaner tray 114. The second flange 130 on the air cleaner cover is inserted inside the channel 132 created by the first flange 128 such that the air cleaner cover 116 is snapped into the air cleaner tray 114. In order to create a frictional or an interference fit between the first flange 128 and the second flange 130, the end of the first flange is provided with a bump 134 and the end of the second flange is provided with a corresponding bump 136. Therefore, as the air cleaner cover is snap fitted to the air clear tray, the bumps 136 and 138 will ensure that a one-way seal is formed. In other words, the air filter assembly 100 can not be opened without destroying the integrity of the bumps 136 and 138. As shown, the filter 112 is compressed as the filter assembly 100 is being assembled. The filter 112 is positioned in the channel 132 created by first flange 128 on the air cleaner tray 114. In order to further seal the filter 112 to the housing, the housing can be welded along the perimeter.

As seen from the above, the first and the second embodiment of the air filter assembly provides for a positive method of sealing the filter in the housing. The seal formed from the embodiments described above, will ensure that the filter can not be removed easily. Additionally, the above sealing configurations, also ensure that the filter does not rattle thereby reducing the noise and vibration in any motor vehicle.

As any person skilled in the art will recognize from the previous description and from the figures and claims, modifications and changes can be made to the preferred embodiment of the invention without departing from the scope of the invention as defined in the following claims.

What is claimed is:

1. An air filter assembly in an air induction system of a motor vehicle, the assembly comprising:
    a housing having an air cleaner tray and an air cleaner cover;
    at least one tray flange defined on the air cleaner tray;
    at least one cover flange defined on the air cleaner cover;

wherein the at least one tray flange and the at least one cover flange define a filter capturing portion and an interlocking portion;

a filter located inside the housing, wherein the filter capable of filtering ambient air; and wherein the filter capturing portion defines a cavity located between a portion of the at least one tray flange and a portion of the at least one cover flange, wherein a portion of the filter is located between the portion of the at least one tray flange and the portion of the at least one cover flange such as to substantially fill the cavity, and wherein the filter is sealed inside the housing.

2. The assembly of claim 1, further comprising at least one meshed screen, wherein the screen holds the filter in the housing.

3. The assembly of claim 1, wherein the filter capturing portion holds the filter inside the housing and the interlocking portion mates the air cleaner cover to the air cleaner tray.

4. The assembly of claim 1, wherein the at least one tray flange has at least one retaining bead in the filter capturing portion, wherein the at least one bead extends laterally into the filter such that the at least one retaining bead compresses the filter.

5. The assembly of claim 1, wherein the at least one cover flange has at least one retaining bead in the filter capturing portion, wherein the at least one bead extends laterally into the filter such that the retaining bead compresses the filter.

6. The assembly of claim 1, wherein the at least one tray flange has a projection extending laterally towards the filter and the at least one cover flange has a corresponding surface to receive the protection, such that the air cleaner cover and the air cleaner tray are sealed.

7. The assembly of claim 1, wherein the at least one cover flange is welded to the at least one tray flange to seal the filter inside the housing.

8. The assembly of claim 1, wherein the at least one tray flange is a U-shaped flange located between the filter capturing portion and the interlocking portion such that a channel is defined by the U-shaped flange.

9. The assembly of claim 8, the at least one cover flange is snapped into the channel such that the air cleaner cover is snap fitted to the air cleaner tray.

10. The assembly of claim 1, wherein the filter is a multilayered filter, wherein one of the layers of the filter is compressed and sealed in the filter capturing portion.

11. The assembly of claim 1, wherein the at least one tray flange and the at least one cover flange directly engage each other in the interlocking portion.

12. The assembly of claim 1, wherein the portion of the filter is located between the at least one tray flange and the at least one cover flange such as to completely fill the cavity.

13. A housing of an air filter assembly in an air induction system of a motor vehicle, the housing comprising:

an air cleaner tray having at least one tray flange;

an air cleaner cover having at least one cover flange;

wherein the at least one tray flange and at least one cover flange define a filter capturing portion and an interlocking portion;

a filter disposed inside the housing, wherein the filter capable of filtering ambient air; and wherein the filter capturing portion defines a cavity, wherein a portion of the filter is located between the at least one tray flange and the at least one cover flange such as to substantially fill the cavity, and wherein the at least one cover flange is welded to the at least one tray flange such that the filter is sealed inside the housing.

14. The housing of claim 13, wherein the filter capturing portion and the interlocking portion are adjacent to each other, wherein the interlocking portion mates the air cleaner cover to the air cleaner tray.

15. The housing of claim 13, wherein the at least one tray flange has at least one retaining bead in the filter capturing portion, wherein the at least one bead extends laterally into the filter such that the at least one retaining bead compresses the filter.

16. The housing of claim 13, wherein the at least one cover flange has at least one retaining bead in the filter capturing portion, wherein the at least one bead extends laterally into the filter such that the retaining bead compresses the filter.

17. The housing of claim 13, wherein the at least one tray flange has a projection extending laterally towards the filter and the at least one cover flange has a corresponding surface to receive the projection, such that the air cleaner cover and the air cleaner tray are sealed.

18. The housing of claim 13, wherein the at least one tray flange is a U-shaped flange such that a channel is defined by the U-shaped flange.

19. The housing of claim 18, the at least one cover flange is snapped into the channel such that the air cleaner cover is snap fitted to the air cleaner tray.

20. The housing of claim 13, wherein the filter is a multilayered filter, wherein one of the layers of the filter is compressed and sealed in the filter capturing portion.

21. The housing of claim 13, wherein the at least one bay flange and the at least one cover flange directly engage each other in the interlocking portion.

22. The housing of claim 13, wherein the portion of the filter is located between the at least one tray flange and the at least one cover flange such as to completely fill the cavity.

* * * * *

UNITED STATES PATENT AND TRADEMARK OFFICE
CERTIFICATE OF CORRECTION

PATENT NO. : 6,890,366 B2
DATED : May 10, 2005
INVENTOR(S) : Neville Jimmy Bugli et al.

It is certified that error appears in the above-identified patent and that said Letters Patent is hereby corrected as shown below:

<u>Title page,</u>
Item [57], ABSTRACT,
Line 6, insert -- be -- before "removed without".

<u>Column 6,</u>
Line 1, after "at least one" delete "bay" and substitute -- tray --.

Signed and Sealed this

Thirtieth Day of May, 2006

JON W. DUDAS
*Director of the United States Patent and Trademark Office*